US008264353B2

(12) United States Patent
Dinh et al.

(10) Patent No.: US 8,264,353 B2
(45) Date of Patent: Sep. 11, 2012

(54) METHOD AND SYSTEM FOR SLIDING DOOR PATTERN CANCELLATION IN METAL DETECTION

(75) Inventors: Erik Lee Dinh, Boca Raton, FL (US); Adam S. Bergman, Boca Raton, FL (US); Manuel A. Soto, Lake Worth, FL (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 310 days.

(21) Appl. No.: 12/774,799

(22) Filed: May 6, 2010

(65) Prior Publication Data

US 2011/0273301 A1 Nov. 10, 2011

(51) Int. Cl.
*G08B 13/14* (2006.01)

(52) U.S. Cl. ..................... 340/568.1; 455/63.1; 702/191

(58) Field of Classification Search .................. 340/600
See application file for complete search history.

(56) References Cited

U.S. PATENT DOCUMENTS 4,697,170 A * 9/1987 Hoekman ..................... 340/551
5,617,513 A 4/1997 Schnitta
6,310,963 B1 * 10/2001 Erdol et al. .................. 382/103
6,742,301 B1 * 6/2004 Schwarz ........................... 49/42
2003/0174057 A1 * 9/2003 Kim et al. ..................... 340/541
2008/0303671 A1 * 12/2008 Dinh et al. ................. 340/572.3
2011/0074581 A1 * 3/2011 Falkenberg et al. ....... 340/568.1
2011/0171910 A1 * 7/2011 Dinh et al. .................. 455/63.1

* cited by examiner

*Primary Examiner* — Brian Zimmerman
*Assistant Examiner* — Sara Samson
(74) *Attorney, Agent, or Firm* — Alan M. Weisberg; Christopher & Weisberg, P.A.

(57) ABSTRACT

A method and system for reducing the signal interference effects of metal doors in a metal detection system. The system includes a transmitter operable to transmit an interrogation signal that is used to detect transitory metal objects within the detection region, a receiver operable to receive instantaneous signals that represent electromagnetic field disturbances during operation of the metal detection system and include electromagnetic field disturbances attributed to the movement of metal doors. The system also includes a metal detection module that determines a resulting waveform representing the difference between the instantaneous signals received during operation of the metal detection system and a recorded pattern of signals representing electromagnetic field disturbances caused by a pattern of movement of the metal doors in the detection region when a transitory metallic object is not present. The record pattern is canceled from the resulting waveform leaving only signals from transitory metal objects.

20 Claims, 6 Drawing Sheets

METHOD AND SYSTEM FOR SLIDING DOOR PATTERN CANCELLATION IN METAL DETECTION

CROSS-REFERENCE TO RELATED APPLICATION n/a

STATEMENT REGARDING FEDERALLY SPONSORED RESEARCH OR DEVELOPMENT n/a

FIELD OF THE INVENTION

The present invention relates generally to metal detection systems and more specifically to a method and system for reducing the signal interference effects of metal doors upon the metal detection capabilities of the metal detection system

BACKGROUND OF THE INVENTION

Metal detection systems are useful in detecting the unauthorized removal of metal items from a protected area as well as detecting metal objects that may be brought into a protected area. Particularly in retail environments, metal detection systems save stores hundreds of thousands of dollars by preventing the unauthorized removal of unpaid-for items from the store. In places such as schools, airports, and stadiums, metal detectors serve the purpose of preventing patrons from bringing in weapons or items that could cause harm to others or leaving with items that they have not purchased.

Metal detection systems are often combined with electronic article surveillance ("EAS") systems. EAS systems are commonly used in retail stores and other settings to prevent the unauthorized removal of goods from a protected area. Typically, such a system is configured at an exit from the protected area. The system includes one or more transmitters, receivers and antennas, stored in a housing (such as an EAS pedestal) capable of generating an electromagnetic field across the exit, known as the "interrogation zone" or "detection region". Articles to be protected are tagged with an EAS marker that, when active, generates a response signal when passed through this interrogation zone. An antenna and receiver in the same or another "pedestal" detects this response signal and generates an alarm and/or sends an alert message to monitoring personnel. Combination EAS/metal detection systems utilize the pedestals to detect both the unauthorized removal of goods as well as metal objects entering or exiting the interrogation zone.

One reason for combining metal detection functions in an EAS system is due to the problems EAS systems experience relating to their inability to detect unauthorized removal of tagged items when the tags are placed in a shielded environment, such as when EAS tags are contained in a metal-lined bag. Often, unscrupulous shoppers bring metal-lined bags to a store with the idea of placing an item having an EAS tag in the bag, and attempt to walk out of the store undetected. EAS detection systems that do not include metal detection capability may be defeated by utilizing this method. Therefore, in order to prevent this from occurring, EAS systems employ metal detection capabilities. With the emergence of metal detection integrated with EAS technology, EAS systems have become more and more robust and seamless in offering customers a complete solution to their loss prevention needs. The new "combination" system utilizes the existing EAS pedestals, thus maximizes efficiency in terms of cost, space and overall aesthetics of the system.

However, metal detection systems, whether they are standalone systems, or combination EAS/metal detection systems are not without their inherent problems. A problem that arises is when a metal detection or combination EAS/metal detection system systems has been installed in close proximity with some type large metal object, such as a metal door frame. Metal doors, such as, for example, sliding metal doors, are common in many retail store environments. These sliding metal doors tend to degrade the performance of metal detection. This is because when installed nearby a metal door frame, the electromagnetic field gradient, which is the essence of metal detection, is compromised as the door is in motion, leading to false alarms. Also, the amount of metal in the door as compared with the amount of metal present in a transitory metallic object such as a tag shield, e.g., foil-lined bag, results in a metal detection response signal from the door that is many orders of magnitude stronger than the response from the transitory metallic object such as the metal tag shield. While these metal doors have no effect on EAS detection, the interference with the metal detection capabilities of the system caused by the opening and closing of these doors and the amount of metal in the door can be quite severe.

Other attempts to lessen or eliminate the effects of metal doors in a metal detection zone have proven to be in adequate. Some of these include shielding and electrically separating the door and the pedestals, recommending a "safe" distance; and developing an entirely new stand-alone metal detection system that works independently from the EAS system. Since a sliding metal door has profound effects on the metal detection system, shielding the door from the antennas is not a practical option. The metal detection portion of combination EAS/metal detection systems are extremely sensitive to any changes in field gradient and therefore no reasonable amount of metal shield is adequate to prevent change in field gradient when the metal sliding doors are in motion. Placing the system at a "safe" distance, or utilizing non-EAS independent metal detection systems are not efficient as the methods defeat the purpose of integrating metal detection into EAS systems, which are more often than not installed in close proximity with sliding metal doors.

Therefore, what is needed is a system and method for nullifying the effects of moving metal doors in a metal detection interrogation zone.

SUMMARY OF THE INVENTION

The present invention advantageously provides a method and system for reducing the signal interference effects of metal doors in a metal detection system. The system includes a transmitter operable to transmit an interrogation signal that is used to detect transitory metal objects within the detection region, a receiver operable to receive instantaneous signals that represent electromagnetic field disturbances during operation of the metal detection system and include electromagnetic field disturbances attributed to the movement of metal doors. The system also includes a metal detection module that determines a resulting waveform representing the difference between the instantaneous signals received during operation of the metal detection system and a recorded pattern of signals representing electromagnetic field disturbances caused by a pattern of movement of the metal doors in the detection region when a transitory metallic object is not present. The record pattern is canceled from the resulting waveform leaving only signals from transitory metal objects detected in the metal detection region without the interference of signals from the metal doors.

In one aspect of the invention, a method of reducing the signal interference effects of metal doors in a metal detection system is provided. The method includes recording a pattern of signals representing electromagnetic field disturbances over time caused by a pattern of movement of the metal doors in a detection region when a transitory metallic object is not present. The method also includes receiving instantaneous signals representing electromagnetic field disturbances during operation of the metal detection system. The instantaneous signals include electromagnetic field disturbances attributed to the movement of the metal doors, where the movement of the metal doors during operation of the metal detection system is substantially the same as the pattern of movement of the metal doors during the recording of the pattern of signals. The method also includes determining a resulting waveform, where the resulting waveform represents a difference between the instantaneous signals received during operation of the metal detection system and the recorded pattern of signals.

In another aspect, a metal detection system is provided. The metal detection system includes a transmitter operable to transmit an interrogation signal, where the interrogation signal establishes a detection region and being used to detect transitory metal objects within the detection region, a receiver operable to receive instantaneous signals in response to the interrogation signal, where the instantaneous signals represent electromagnetic field disturbances during operation of the metal detection system, the instantaneous signals including electromagnetic field disturbances attributed to the movement of metal doors, and a metal detection module. The metal detection module determines a resulting waveform, where the resulting waveform represents a difference between the instantaneous signals received during operation of the metal detection system and a recorded pattern of signals representing electromagnetic field disturbances over time caused by a pattern of movement of the metal doors in the detection region when a transitory metallic object is not present. The movement of the metal doors during operation of the metal detection system is substantially the same as the pattern of movement of the metal doors during the recording of the pattern of signals. The metal detection module is operable to determine if a metal object is present in the detection region based on the resulting waveform.

In accordance with yet another aspect, an integrated EAS/metal detection system is provided. The integrated EAS/metal detection system includes a transmitter operable to transmit an interrogation signal, the interrogation signal establishing an interrogation zone and being used to detect EAS markers and transitory metal objects within the interrogation zone, and a receiver operable to receive instantaneous signals in response to the interrogation signal. The instantaneous signals represent electromagnetic field disturbances during operation of the metal detection system, the instantaneous signals including electromagnetic field disturbances attributed to the movement of metal doors. The system further includes a metal detection module operable to determining a resulting waveform, the resulting waveform representing a difference between the instantaneous signals received during operation of the metal detection system and a recorded pattern of signals representing electromagnetic field disturbances over time caused by a pattern of movement of the metal doors in the detection region when a transitory metallic object is not present. The movement of the metal doors during operation of the metal detection system is substantially the same as the pattern of movement of the metal doors during the recording of the pattern of signals. The metal detection module is operable to determine if a metal object is present in the detection region based on the resulting waveform.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
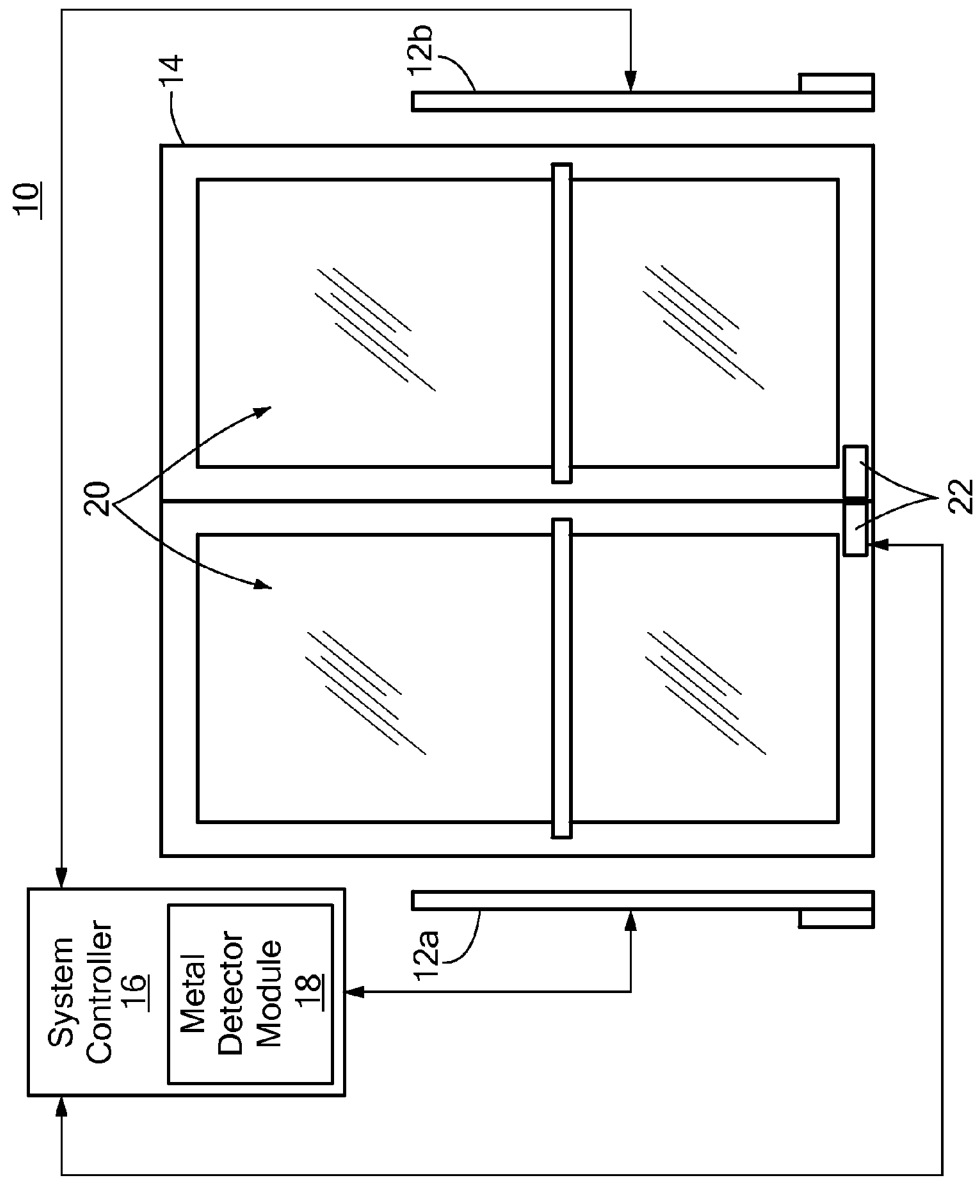
FIG. 1 is a diagram of an exemplary integrated electronic article surveillance ("EAS")/metal detection system with closed metal doors constructed in accordance with the principles of the present invention.

Before describing in detail exemplary embodiments that are in accordance with the present invention, it is noted that the embodiments reside primarily in combinations of apparatus components and processing steps related to implementing a system and method for reducing false alarms in metal detection or integrated EAS/metal detection systems caused by field disturbances attributed to the opening and closing of metal doors within or proximate the metal detection interrogation zone. Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

One embodiment of the present invention advantageously provides a method and system for reducing false alarms that occur in metal detection systems due to field disturbances caused by the opening and closing of sliding metal doors proximate the metal detection interrogation zone. The movement of sliding metal doors introduces extraneous signals within the electromagnetic ("EM") field that may mask the detection of actual metal objects being brought into or out of a metal detection zone. The present invention measures the signals produced by the movement of the metal doors without the presence of other metal objects, records these signals, and filters them out of the total instantaneous detected EM energy received during actual metal detection in order to more accurately determine if a metal object has been detected without the potential interference form signal disturbances caused by the movement of the metal doors.

Referring now to the drawing figures in which like reference designators refer to like elements, there is shown in FIG. 1 an exemplary configuration of an integrated EAS/metal detection system 10 constructed in accordance with the principles of the present invention and located, for example, at a retail facility entrance. It should be noted that the present invention is equally adaptable to stand-alone metal detection systems as with integrated EAS/metal detection systems. Thus, the terms "EAS/metal detection system", "metal detection system" and "detection system" are used interchangeably throughout this specification and the exclusion of one or the other shall not limit the invention in any way.

EAS detection system 10 includes a pair of pedestals 12*a*, 12*b* (collectively referred to herein as "pedestals 12") on opposite sides of a door entrance 14. One or more antennas for the detection system 10 may be included in pedestals 12*a* and 12*b*, which are located a known distance apart. The antennas located in the pedestals 12 are electrically coupled to a system controller 16 which controls the operation of the detection system 10. Within system controller 16 is a metal detection module 18 that detects the presence of metal objects within a metal detection region. Metal detection module 18 detects the presence of metal objects entering or leaving an interrogation zone established by the antennas within pedestals 12. Metal detection module 18 may be implemented in hardware and/or as software operating on a microprocessor. Metal detection module 18 may also be a software module stored within the memory of, for example, a system controller of a combination EAS/metal detection system which is executed by a microprocessor. Alternately, metal detection module 18 can, itself, have a controller or other processing unit that performs the metal detection functions.

Metal detection module 18 operates to detect the presence of metal objects within a given metal detection zone. Metal detection module 18 includes a transmitting antenna that transmits metal detection interrogation signals at a specified frequency such as, for example, 56 kHz. The transmitter may be located on, within, or near the pedestal 12 at the entrance of the store, and transmits an electromagnetic signal within a specified interrogation zone. The interrogation zone could be, for example, a floor of a store where metal objects may be brought into or removed from the zone. The transmitter also includes the necessary hardware and software to generate the signal. Metal detection module 18 also includes an antenna, "listens" for signals received from metal objects and forwards these signals to metal detection module 18. In one embodiment, if the received signal is above a given threshold, then the metal detection alarm will sound.

One method for detecting metal is based on detecting an induced eddy current during an electromagnetic ("EM") excitation. The induced eddy current dissipates very quickly, on the order of tens of microseconds in the case of a good conductor. The dissipation is worse with a poor conductor. Even with a good conductor, eddy current dissipation is about two orders of magnitude shorter than that of the acoustic marker.

Entrance 14 includes one or more sliding metal doors 20, which open or close when patrons approach the doors 20. Located on or proximate doors 20 is one or more door sensors 22, which detect movement, i.e., opening or closing of the doors 20 such as when a patron approaches doors 20 in order to enter or leave the store. Sensors 22 are in operable communication with system controller 16 and, more particularly, metal detection module 18, and send signals to system controller 16 and/or detection module 18 indicating if the doors 20 are open or closed, and if open, to what extent they are open. Sensors 22 can be one or more sensors depending on the complexities related to the metal doors 20 and their design. The invention is not limited to a specific number or placement of sensors 22. It is also noted that the term "sensor" as used herein refers to any device that can detect the position of doors 20. In other words, it is contemplated that a sensor as used in accordance with the present invention can be a contact switch, magnetic switch, voltage translator, etc.

Figure 2:
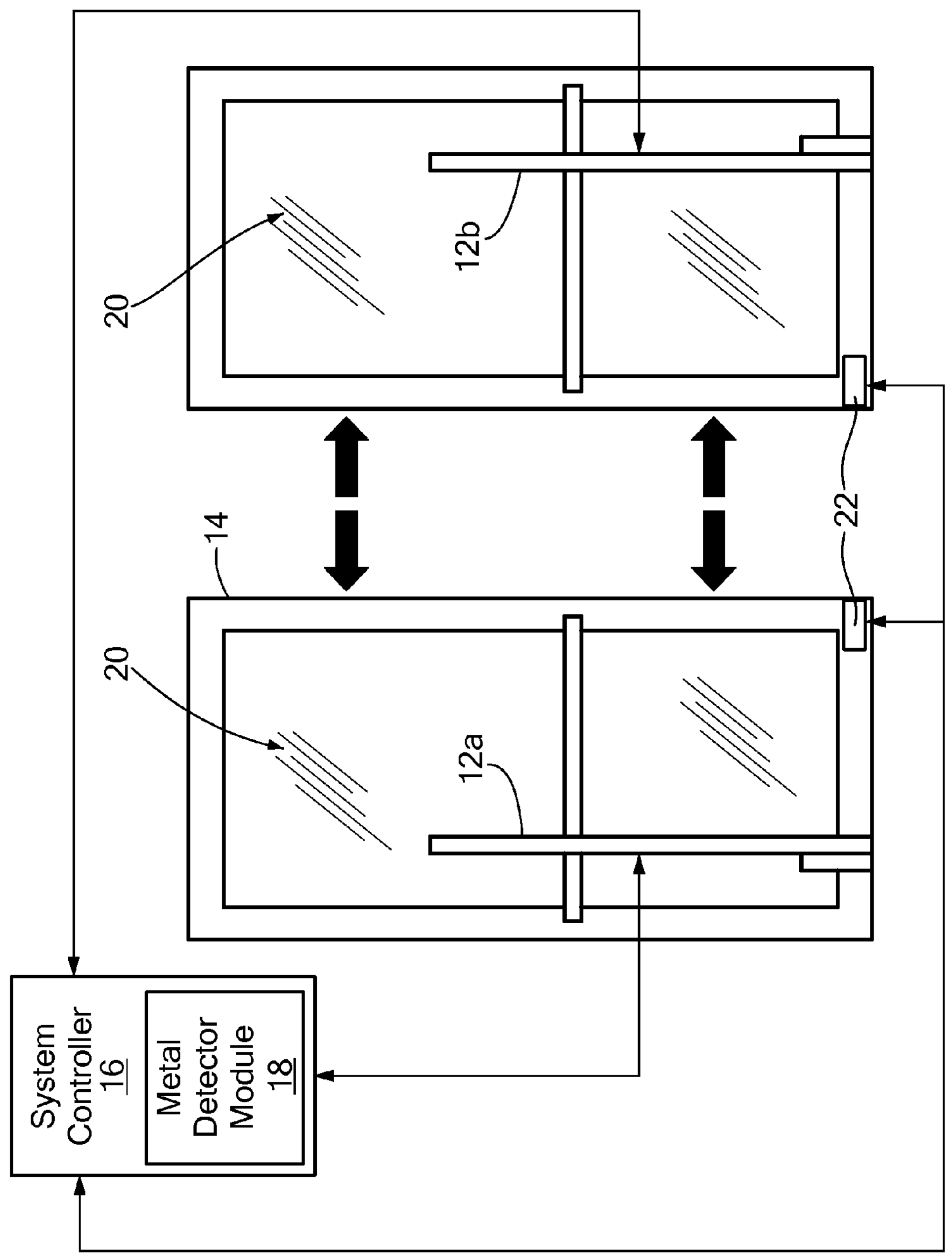
FIG. 2 is a diagram of the integrated EAS/metal detection system of FIG. 1 showing the sliding metal doors in an open configuration.

As shown in FIG. 1, doors 20 are in a closed configuration, indicating that no patrons have approached doors 20. FIG. 2 shows doors 20 in an open orientation. Thus, one or more patrons have approached doors 20, which, as is well known in the art, are designed to sense the approach of a person and open automatically. Door sensors 22 detect not only that doors 20 have opened but also detects to what extent they are open, i.e., the relative position doors 20 are in when compared to a fully closed position, as in FIG. 1. Information regarding the positional status of doors 20 is transmitted to system controller 16 and/or metal detection module 18 either via a wired or wireless connection.

Figure 3:
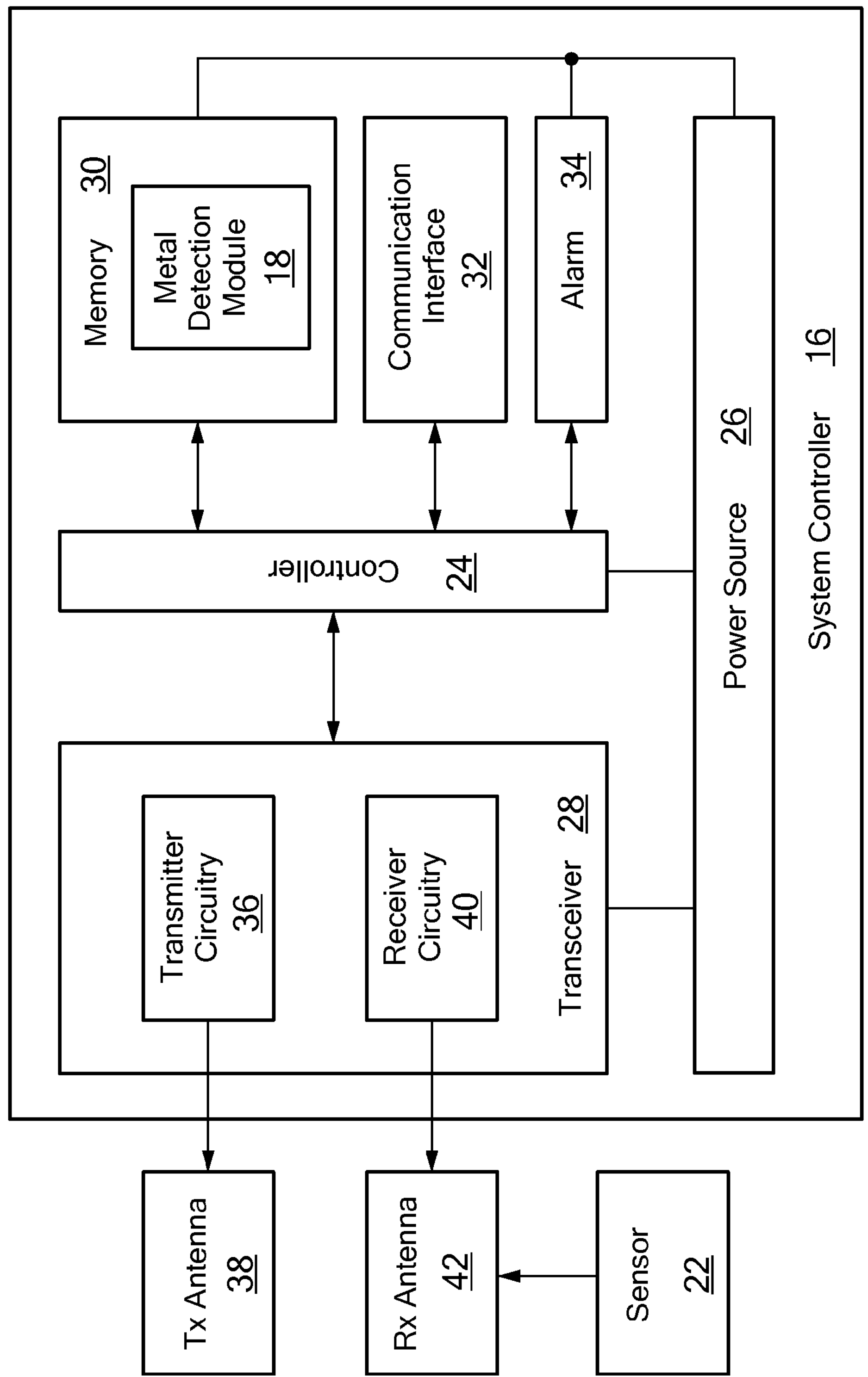
FIG. 3 is a block diagram of an exemplary integrated EAS/metal detection system constructed in accordance with the principles of the present invention.

As mentioned above, the present invention is adaptable to be used not only in a stand-alone metal detection system but also in a combination EAS/Metal Detection system. Referring now to FIG. 3, an exemplary integrated EAS/Metal Detection system that may include a controller 24 (e.g., a processor or microprocessor), a power source 26, a transceiver 28, a memory 30 (which may include non-volatile memory, volatile memory, or a combination thereof), a communication interface 32 and an alarm 34. The controller 24 controls radio communications, storage of data to memory 30, communication of stored data to other devices, and activation of the alarm 34. The power source 26, such as a battery or AC power, supplies electricity to the EAS system controller 16. The alarm 34 may include software and hardware for providing a visual and/or audible alert in response to detecting an EAS marker and/or metal within an interrogation zone of the EAS/Metal Detection system 10.

The transceiver 28 may include a transmitter 36 electrically coupled to one or more transmitting antennas 38 and a receiver 40 electrically coupled to one or more receiving antennas 42. Alternately, a single antenna or pair of antennas may be used as both the transmitting antenna 38 and the receiving antenna 42. The transmitter 36 transmits a radio frequency signal using the transmit antenna 38 to "energize" an EAS marker within the interrogation zone of the EAS/Metal Detection system 10. The receiver 40 detects the response signal of the EAS marker using the receive antenna 42.

In one embodiment, metal detection module 18 is a software module stored within memory 30. However, metal detection module 18 may also be implemented by using discrete components or may be a combination of hardware and software elements. For example, in addition to or instead of controller 24, metal detection module 18 can, itself, have a controller or other processing unit that performs the filtering and metal detection functions described here.

Sensors 22 transmit signals to antenna 42 indicating the relative position of doors 20. These signals indicate the exact position of doors 20 within entrance 14. Antenna 42 sends this information to system controller 16. The position information is also sent to metal detection module 18. The opening and closing of metal doors 20 exhibit a recognizable pattern of interference with regard to the electromagnetic ("EM") field. Advantageously, the present invention utilizes this information by recording these patterns and using them as a reference. For example, without operating the metal detection system for the purpose of metal detection, i.e., for the purpose of calibration without the presence of a transitory metallic object in the interrogation zone established by pedestals 12, metal detection interrogation signals can be recorded that relate to the amount of electromagnetic field gradient disturbance caused by doors 20 and they move from a fully closed position and gradually open toward a fully open position. The metal detection system can record the effects of metal doors 20 on the EM field without any metal objects in the metal detection zone to determine the disturbances due solely to the presence and movement of metal doors 20. Signal strength measurements are periodically made as doors 20 move to their fully open position. The sampling rate of the measurements can be based on the processing speed and storage memory of system controller 16. The signal strength measurements form a pattern. The signal strength measurements forming the pattern are then recorded and used as a reference for pattern recognition and cancellation, resulting in a nullified metal detection signal free of effects from the moving door. Thus, instead of metal detection module 18 only receiving signals from antenna 42 and processing these signals to determine if metal objects are present, metal detection module 18 now also receives metal door position information obtained by sensor 22.

As is described below, metal detection module 18 compares a series of instantaneous signals received from antenna 42, where these signals indicate the electromagnetic field disturbances received during the metal detection phase. The signals include responses from interrogated metal objects as well as signals attributed to the movement of the metal doors 20. Metal detection module 18 compares these received signals with the pre-recorded pattern of signals related exclusively to the EM disturbances caused by the movement of the metal doors 20 in order to provide a resulting nullified signal indicating the presence of metal objects in the metal detection region without the interfering effects from metal doors 20.

Figure 4:
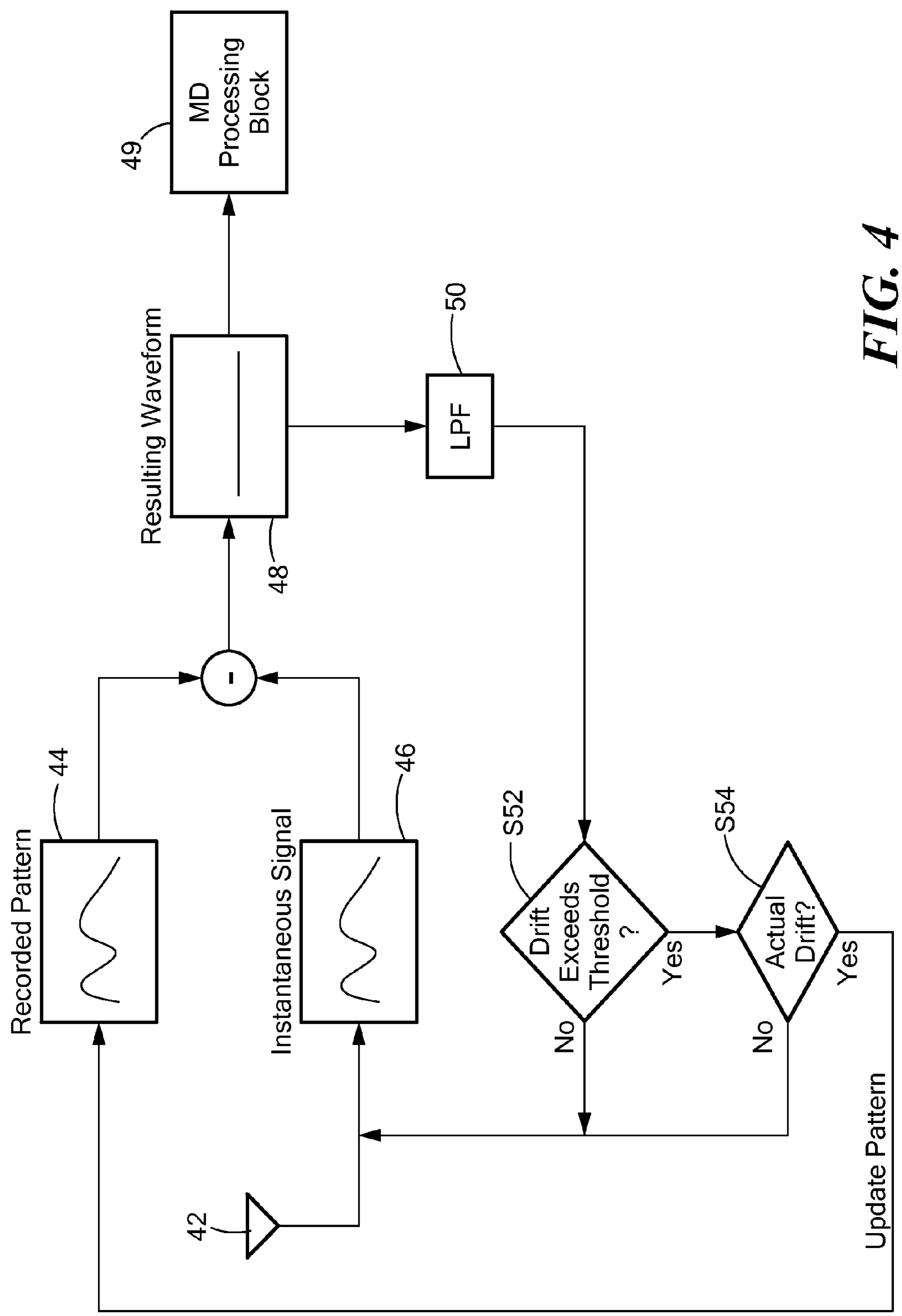
FIG. 4 is a block diagram illustrating an exemplary process by which the present invention detects and cancels extraneous disturbances caused by the opening of metal doors within the metal detection zone when there are no metal objects in the metal detection zone.

FIG. 4 is a block diagram illustrating an exemplary process by which the present invention detects and records patterns of interference caused by the opening of doors 20 upon the metal detection capabilities of the system 10 and how the interference caused by the doors 20 can be filtered out and eliminated, thus allowing metal detection to occur without the extraneous metal door signal interference. In FIG. 4, a pattern 44 representing signals related to EM disturbances caused by the movement of metal doors 20 is initially sampled and recorded in order to establish a base reference pattern. Thus, for example, measurements are taken as metal doors 20 are opened. These measurements track the EM field disturbances caused by the opening and closing of the doors 20 over time without the operation of metal detection module 18 and without any other transitory metallic objects, e.g., foil-lined bags, present. Thus, the recorded waveform represents EM disturbances caused solely by doors 20 without any metal detection taking place. In one embodiment, the samples of the opening of doors 20 are taken and recorded over and over until a consistent pattern is detected.

When the metal detection portion of system 10 is in operation, antenna 42 is receiving signals that indicate the presence or absence of metal objects within the metal detection region. These instantaneous signals include interference signals caused by the opening of metal doors 20 as well as any transitory metallic objects and provide an instantaneous signal over time, resulting in waveform 46. Because of the influence of metal doors 20, the signal 46 detected may mask the actual small signals received from transitory metal objects. However, because waveform 44 represents the disturbances caused solely by the opening and closing of doors 20, these signals are subtracted, or cancelled, resulting in a nullified signal, represented by waveform 48. FIG. 4 depicts the scenario where there are no metal objects detected in the detection region. In other words, the recorded waveform 44 caused by disturbance patterns created by the opening of doors 20 without metal detection and the instantaneous waveform 46 detected during metal detection operation are virtually identical, since there are no transitory metal objects in the detection region and the signals detected are all due to metal doors 20. Thus, resulting waveform 48 shows a substantially flat line, indicating no disturbances over time, as waveform 46 and waveform 44 have canceled each other out.

It should be noted that although waveform 48 is represented by a substantially horizontal line in FIG. 4, such a line does not imply that the result of subtracting recorded pattern 44 from instantaneous signal 46 (of vice verse) should be zero. It is contemplated that that the substantially horizontal line can be offset from the zero point of the "y-axis". The resulting nullified signal 48 is then processed by metal detector processing block 49, free of metal door influences and disturbances, to determine if there are metal objects passing through system 10. In the case of the example shown in FIG. 4, metal detector processing block 49 determines from waveform 48 that no transitory metal objects are present in the metal detection region.

The signal represented by resulting waveform 48 corresponds to the scenario where there are no transitory metal objects in the metal detection zone. This signal is passed through a low pass filter ("LPF") 50 to filter out any extraneous signals that might indicate that metal is in the region. Because the recorded waveform 44 may change over time due to environmental changes, the present invention includes an arrangement that updates waveform 44 accordingly to account for these changes. The change that may occur over time is referred to as "drift". This drift warrants an update of recorded pattern 44 when the drift falls within a certain predetermined range or has exceeded a predetermined threshold. Low pass filter 50 is used to ensure this drift is "real" and satisfies two criteria: gradual drift and permanent drift.

The filtered signal is examined to determine if the actual signal drift has exceeded a threshold amount (step S52). If the drift has exceeded the predetermined threshold amount, it is then be determined if the drift is real and not due to other factors such as outliers or "spikes" in the system (step S54). Steps S52 and S54 can be performed by hardware, software or a combination of both within, for example, system controller 16. If actual drift has occurred, the system controller 16 updates the stored pattern 44 such as by using the latest instantaneous pattern, i.e., the waveform that results after filter 50 has processed waveform 48 or by prompting management personnel to institute a recalibration process by which recorded pattern 44 is knowingly obtained without the presence of transitory metal in the system. Thus, when excess drift has occurred, system 10 advantageously updates stored recorded pattern 44. This provides a more accurate benchmark for future metal object detection using the present invention. If it is determined that the drift is not actual drift but due to extraneous outliers, or if the drift has not exceeded the predetermined threshold, recorded pattern 44 is not updated and the current recorded pattern 44 continues to be used.

Therefore, system 10 includes a module for determining whether any drift has occurred. This module, which may include filter 50, may include any combination of hardware and software necessary to determine whether this drift is actual drift and not caused by outliers, and whether the recorded pattern of signals caused by the movement of metal doors 20 needs to be updated.

Figure 5:
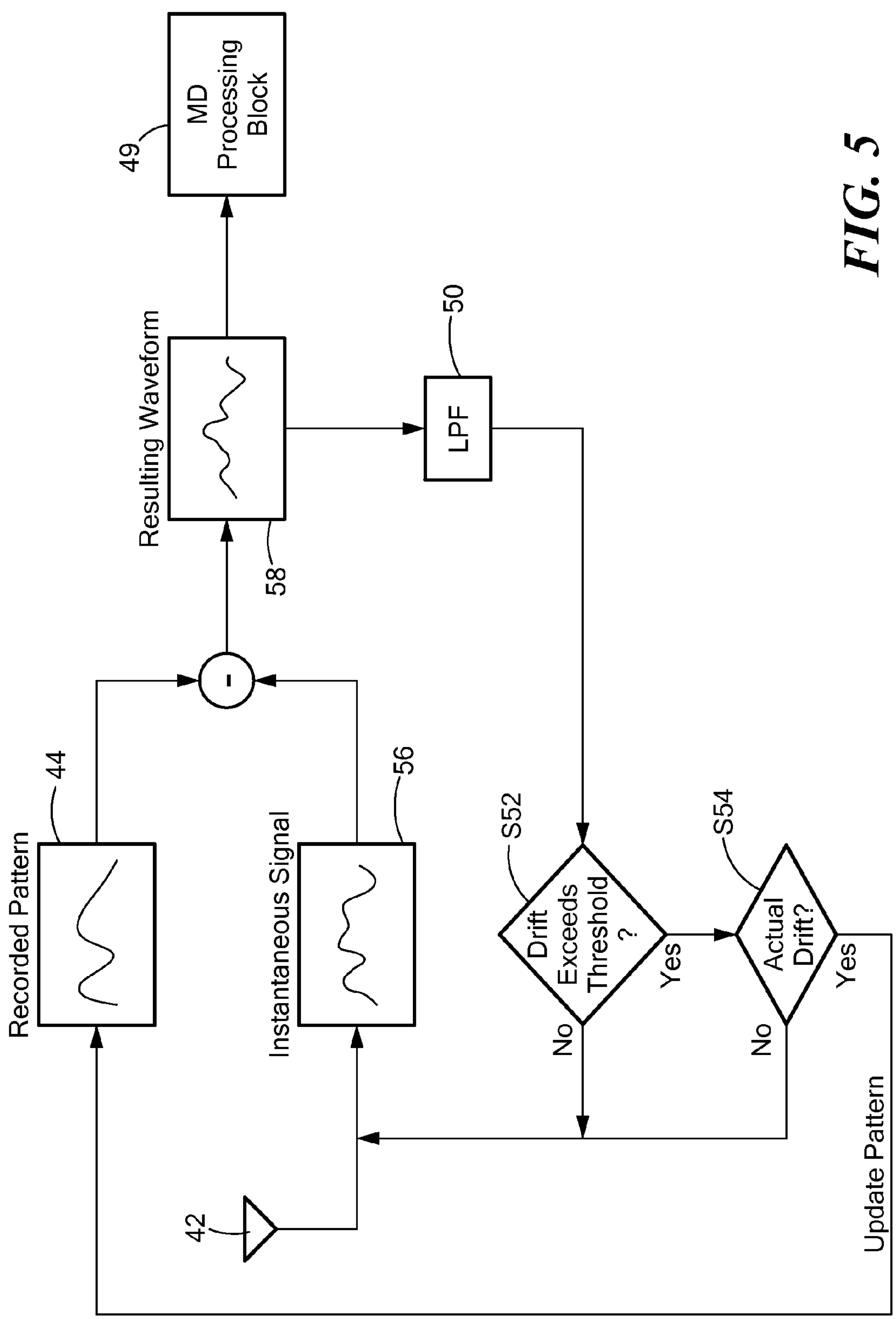
FIG. 5 is a block diagram illustrating an exemplary process by which the present invention filters out extraneous disturbances caused by the opening of metal doors to detect metal objects in the metal detection zone when there are metal objects present in the metal detection zone.

FIG. 5 is a diagram showing an arrangement in which transitory metal objects are present in the metal detection zone. In this embodiment, waveform 44 representing EM disturbances due to the movement of metal doors 20 is subtracted from the waveform of instantaneous signal 56, which represents the instantaneous signal received from antenna 42, as in FIG. 4. However, now, the resulting waveform 58 that is sent to metal detector processing block 49 represents the presence of transitory metal objects in the metal detection zone, since the nullified signal represented by waveform 58 is no longer flat, as in FIG. 4. Thus, resulting waveform 58 represents the difference between actual instantaneous signal 56, which includes the disturbances patterns caused by the movement of doors 20, and recorded waveform 44 which is based solely on doors 20. The resulting waveform 58 is processed by metal detector processing block 49 which, in the case of the embodiment of FIG. 4, determines the presence of metal objects in the detection zone. Advantageously, the resulting signal 58 is not degraded by the influence of metal doors 20, since the disturbance pattern due to doors 20 is known, and removed from the instantaneous signal 56. As in FIG. 4, filter 50, which may be a low pass filter, along with the functions performed at steps S52 and S54, determine if any perceived drift exceeds a predetermined threshold and whether the drift is "actual" drift and not caused by any outliers. If the perceived drift is determined to be actual drift, then the originally-recorded disturbance pattern 44 is replaced by the current resulting waveform 58 and used for subsequent metal detection analyses. In one embodiment, low pass filter 50 is a slow filter that has a large number of taps, e.g., 500-1000 taps, to thereby eliminate short term changes, i.e., impulses, from triggering the drift threshold re-recording process.

Figure 6:
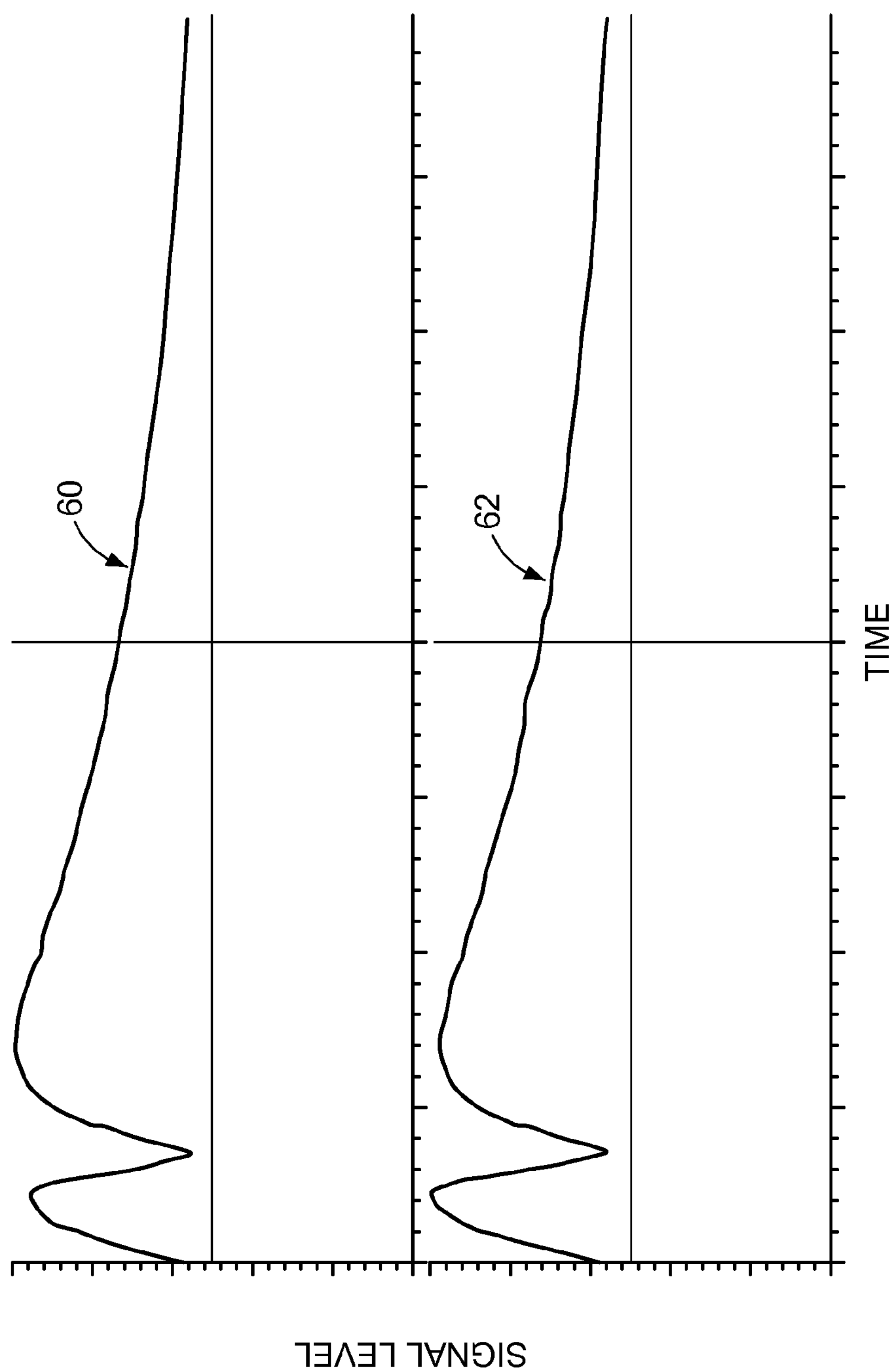
FIG. 6 is a comparison between a recorded waveform representing interference caused by a sliding metal door and an instantaneous waveform representing field disturbance detected by the metal detection system of the present invention.

FIG. 6 illustrates a comparison of an exemplary recorded pattern 60 representing metal door EM field disturbances and an exemplary instantaneous signal 62 representing instantaneous field disturbances measured by a metal detection system utilizing the present invention. Each waveform measures the level of disturbance (vertical axis) vs. time (horizontal axis), where metal doors 20 begin in a fully closed position and gradually separate, getting further and further apart, until fully opened. The top waveform, i.e., recorded pattern 60 in FIG. 6 represents the recorded waveform of disturbance signals produced by doors 20 moving from a fully closed position to a fully open position. This waveform 60 represents disturbance signals due to doors 20 only, and not due to any other metal objects. The waveform shown as instantaneous signal 62 represents the measured instantaneous metal detection signal received by antenna 42, and includes both disturbance signals from doors 20 as well as any other signals detected by antenna 42 in response to a metal detection interrogation signal.

In the example shown in FIG. 6, there is very little difference between the recorded pattern 60 and the actual instantaneous signal 62, thus indicating that no transitory metal objects are present in the metal detection zone, as shown in the scenario in FIG. 4. In this scenario, the resulting nullified waveform would be a substantially horizontal line such as the nullified resulting waveform 48 in FIG. 4, or another visual image indicating that waveform 60 and waveform 62 are virtually identical, due to the fact that no other transitory metal objects are contributing to EM field disturbances other than movement of metal doors 20. However, if metal objects were in the metal detection zone, the resulting waveform would be recognizably different from nullified resulting waveform 48, perhaps showing "peaks" and/or "valleys". Depending upon the scale of the axes, these variations could appear larger or smaller in waveform 58. These variations would indicate the actual presence of transitory metal objects in the detection zone and the difference between the waveform for instantaneous signal 62 and the waveform for the recorded pattern 60 would be a pattern other than the substantially horizontal line as when there were no metal objects detected. Advantageously, once the waveform attributed to the movement of metal doors 20 is cancelled from the composite waveform, the remaining waveform can be processed by metal detection processing block 49 where it is determined if metal objects are in the metal detection region, without the interference of metal doors 20.

Of note, although the present invention is discussed and described using examples where doors 20 start from a fully closed position to a completely open position, the present invention is not limited to such. It is contemplated that a series of different patterns can be recorded where doors 20 commence opening prior to being fully closed. Such a situation might occur, for example, where a patron triggers door opening prior to complete closure. By recording the series of patterns, the instantaneous signal can be compared with the recorded pattern corresponding to the closure state of doors 20 when the opening is triggered. For example, a pattern can be recorded where door opening is triggered when doors 20 are only closed 50%. If it is determined that that the instantaneous signal is based on the 50% closure pattern, the recorded pattern corresponding to the 50% closure is used for comparison.

The present invention advantageously accounts for EM signal disturbances that are attributed to the opening and closing of metal doors 20 within a metal detection zone that would otherwise mask the detection of actual objects in the metal detection zone. By pre-recording the effects of doors 20 over time, a waveform 44 is created. This waveform 44 is subtracted from the actual, detected instantaneous signal received from antenna 42 due to the interrogation response signals received from objects within the metal detection zone. The resulting waveform is analyzed to determine if transitory metal objects are actually present in the metal detection region, where the resulting waveform no longer includes the effects of metal doors 20. It is noted that the present invention is adaptable both to metal detection systems as well as integrated EAS/metal detection systems. Thus, metal foil detection can be accomplished in systems that are already utilizing EAS technology to prevent the unauthorized removal of goods from a protected area. The method and system of the present invention enhances EAS capability by reducing the effects that sliding metal doors have on metal detection capability to more efficiently and accurately detect when metal objects, such as metal foil bags, are brought into the detection region, for the purpose of removing objects from the EAS and metal detection zone.

The present invention can be realized in hardware, software, or a combination of hardware and software. Any kind of computing system, or other apparatus adapted for carrying out the methods described herein, is suited to perform the functions described herein.

A typical combination of hardware and software could be a specialized or general purpose computer system having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

What is claimed is:

1. A method of reducing the signal interference effects of metal doors in a metal detection system, the method comprising:

recording a pattern of signals representing electromagnetic field disturbances over time caused by a pattern of movement of the metal doors in a detection region when a transitory metallic object is not present;

receiving instantaneous signals representing electromagnetic field disturbances during operation of the metal detection system, the instantaneous signals including electromagnetic field disturbances attributed to the movement of the metal doors, the movement of the metal doors during operation of the metal detection system being substantially the same as the pattern of movement of the metal doors during the recording of the pattern of signals; and determining a resulting waveform, the resulting waveform representing a difference between the instantaneous signals received during operation of the metal detection system and the recorded pattern of signals.

2. The method of claim 1, wherein the recorded pattern of signals obtained when a transitory metallic object is not present is sampled and recorded over time as the metal doors move from a substantially closed position to a substantially open position.

3. The method of claim 1, further comprising sensing a relative position of the metal doors as the doors move from a substantially closed position to a substantially open position.

4. The method of claim 1, further comprising determining an existence of signal drift in the pattern of signals representing electromagnetic field disturbances over time caused by the pattern of movement of the metal doors in a detection region when a transitory metallic object is not present.

5. The method of claim 4, further comprising determining if the signal drift is within a predetermined range.

6. The method of claim 5, further comprising determining if the signal drift represents actual signal drift.

7. The method of claim 6, further comprising revising the recorded pattern of signals obtained when a transitory metallic object is not present if it is determined that actual signal drift is within a predetermined range.

8. A metal detection system comprising:

a transmitter operable to transmit an interrogation signal, the interrogation signal establishing a detection region and being used to detect transitory metal objects within the detection region;

a receiver operable to receive instantaneous signals in response to the interrogation signal, the instantaneous signals representing electromagnetic field disturbances during operation of the metal detection system, the instantaneous signals including electromagnetic field disturbances attributed to the movement of metal doors; and a metal detection module operable to:

determining a resulting waveform, the resulting waveform representing a difference between the instantaneous signals received during operation of the metal detection system and a recorded pattern of signals representing electromagnetic field disturbances over time caused by a pattern of movement of the metal doors in the detection region when a transitory metallic object is not present, the movement of the metal doors during operation of the metal detection system being substantially the same as the pattern of movement of the metal doors during the recording of the pattern of signals; and determine if a metal object is present in the detection region based on the resulting waveform.

9. The system of claim 8, wherein the recorded pattern of signals obtained when a transitory metallic object is not present is sampled and recorded over time as the metal doors move from a substantially closed position to a substantially open position.

10. The system of claim 8, further comprising at least one motion sensor positioned proximate the metal doors, the at least one motion sensor in communication with the metal detection module and operable to sense a relative position of the metal doors as the doors move from a substantially closed position to a substantially open position.

11. The system of claim 8, further comprising a module for determining an existence of signal drift in the recorded pattern of signals caused by a pattern of movement of the metal doors in a detection region when a transitory metallic object is not present.

12. The system of claim 11, wherein the module for determining the existence of signal drift further determines if the signal drift is within a predetermined range.

13. The system of claim 12, wherein the module for determining an existence of signal drift further determines if the signal drift represents actual signal drift.

14. The system of claim 13, wherein the module revises the recorded pattern of signals obtained when a transitory metallic object is not present if it is determined that actual signal drift is within a predetermined range.

15. An integrated EAS/metal detection system comprising:

a transmitter operable to transmit an interrogation signal, the interrogation signal establishing an interrogation zone and being used to detect EAS markers and transitory metal objects within the interrogation zone;

a receiver operable to receive instantaneous signals in response to the interrogation signal, the instantaneous signals representing electromagnetic field disturbances during operation of the metal detection system, the instantaneous signals including electromagnetic field disturbances attributed to the movement of metal doors; and a metal detection module operable to:

determining a resulting waveform, the resulting waveform representing a difference between the instantaneous signals received during operation of the metal detection system and a recorded pattern of signals representing electromagnetic field disturbances over time caused by a pattern of movement of the metal doors in the detection region when a transitory metallic object is not present, the movement of the metal doors during operation of the metal detection system being substantially the same as the pattern of movement of the metal doors during the recording of the pattern of signals; and determine if a metal object is present in the detection region based on the resulting waveform.

16. The integrated EAS/metal detection system of claim 15, wherein the recorded pattern of signals obtained when a transitory metallic object is not present is sampled and recorded over time as the metal doors move from a substantially closed position to a substantially open position.

17. The integrated EAS/metal detection system of claim 15, further comprising at least one motion sensor positioned proximate the metal doors, the at least one motion sensor in communication with the metal detection module and operable to sense a relative position of the metal doors as the doors move from a substantially closed position to a substantially open position.

18. The integrated EAS/metal detection system of claim 15, further comprising a module for determining an existence of signal drift in the recorded pattern of signals caused by a pattern of movement of the metal doors in a detection region when a transitory metallic object is not present.

19. The integrated EAS/metal detection system of claim 18, wherein the module for determining the existence of signal drift further determines if the signal drift is within a predetermined range.

20. The integrated EAS/metal detection system of claim 19, wherein the module revises the recorded pattern of signals obtained when a transitory metallic object is not present if it is determined that signal drift is within a predetermined range.

* * * * *